United States Patent
Sultenfuss et al.

(10) Patent No.: US 11,088,565 B2
(45) Date of Patent: Aug. 10, 2021

(54) LOAD-BASED MANAGEMENT OF MULTIPLE DC POWER SOURCES

(71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 16/128,110

(22) Filed: Sep. 11, 2018

(65) Prior Publication Data
US 2020/0083740 A1    Mar. 12, 2020

(51) Int. Cl.
 G06F 1/26    (2006.01)
 H02J 7/34    (2006.01)
 H04L 12/10    (2006.01)

(52) U.S. Cl.
 CPC ............... *H02J 7/34* (2013.01); *G06F 1/263* (2013.01); *H04L 12/10* (2013.01)

(58) Field of Classification Search
 CPC ....................................................... G06F 1/263
 See application file for complete search history.

(56) References Cited

U.S. PATENT DOCUMENTS

| | | | | |
|---|---|---|---|---|
| 8,201,002 B2* | 6/2012 | Chang | ................... | G06F 1/3203 323/304 |
| 9,270,132 B2* | 2/2016 | Yun | ....................... | H02J 7/0063 |
| 2004/0160213 A1* | 8/2004 | Stanesti | ................ | H02J 7/0018 320/116 |
| 2005/0268957 A1* | 12/2005 | Enomoto | .................. | H02J 7/35 136/244 |
| 2006/0044724 A1* | 3/2006 | Ishii | ...................... | H02M 3/158 361/90 |

OTHER PUBLICATIONS

Universal Serial Bus, "USB Power Delivery." Retrieved from url: http://www.usb.org/developers/powerdelivery/, Jun. 28, 2017; 3 pages, Jun. 28, 2017.

* cited by examiner

*Primary Examiner* — Kim Huynh
*Assistant Examiner* — Eric Chang
(74) *Attorney, Agent, or Firm* — Baker Botts L.L.P.

(57) ABSTRACT

Techniques for power source management in an information handling system (IHS) include detecting connection of multiple power sources to the IHS through respective DC adapters, obtaining data indicating the capabilities of each power source, obtaining data indicating a system load for the IHS, and generating, based on the obtained data, a load management plan specifying a target combined input power amount for power supplied by the multiple power sources and respective amounts of electrical power to be supplied by a single selected power source or by multiple selected power sources. The techniques also include combining the power supplied by each of the selected power sources into a combined input power and supplying the combined input power to the IHS. Prior to the combining, the voltage of the power supplied by a power source may be stepped up or down to a common voltage, or a power source may be de-rated.

15 Claims, 4 Drawing Sheets

LOAD-BASED MANAGEMENT OF MULTIPLE DC POWER SOURCES

BACKGROUND

Field of the Disclosure

This disclosure relates generally to information handling systems and, more particularly, to load-based management of multiple DC power sources.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

Historically, information handling systems implemented a "single point of load" approach requiring a 1:1 source-to-load architecture. Newer technologies, such as the Universal Serial Bus (USB), which is developed and supported by the USB Implementers Forum, Inc. (USB IF, www.usb.org), support multiple voltages and power levels over a single connector. This also has limits, however, as some adapters may support 1 to 4 voltage profiles, at differing wattages, but continue the 1:1 source-to-load architecture through the single connection.

SUMMARY

In one aspect, a disclosed method is for power source management in an information handling system. The method includes detecting connection of multiple power sources to the information handling system through respective direct current (DC) adapters, obtaining data indicating capabilities of each of the multiple power sources, obtaining data indicating a system load for the information handling system, and determining, based on the data indicating capabilities of each of the multiple power sources and the data indicating a system load, a target combined input power amount for power supplied by the multiple power sources and a respective amount of electrical power to be supplied by each of one or more power sources selected from among the multiple power sources to supply the target combined input power amount. The method also includes combining the respective amounts of power supplied by each of the one or more selected power sources into a combined input power for the information handling system, and supplying the combined input power to the information handling system.

In any of the disclosed embodiments, the system load for the information handling system may be dependent on a requested amount of electrical power, a calculated amount of electrical power, or a negotiated amount of electrical power.

In any of the disclosed embodiments, for at least two of the multiple power sources, the power supplied by the at least two power sources may have dissimilar electrical characteristics, the dissimilar electrical characteristics including different DC voltage profiles or different wattages.

In any of the disclosed embodiments, the method may include stepping the DC voltage of the power supplied by at least one of the selected power sources up or down prior to the combining.

In any of the disclosed embodiments, the target combined input power amount may be less than the sum of the rated power outputs of each of the one or more selected power sources, and combining the respective amounts of power supplied by each of the one or more selected power sources may include de-rating at least one of the selected power sources.

In any of the disclosed embodiments, for at least two of the multiple power sources, the respective DC adapters may be of dissimilar physical types or may adhere to different power delivery protocols.

In any of the disclosed embodiments, a single one of the multiple power sources may be selected to supply all of the target combined input power amount.

In any of the disclosed embodiments, the single one of the multiple power sources may be the one of the multiple power sources having the smallest power deliver capacity capable of supplying the target combined input power amount.

In any of the disclosed embodiments, the data indicating a system load for the information handling system may include data specifying an amount of electrical power required for charging an internal battery of the information handling system.

In any of the disclosed embodiments, combining the respective amounts of power supplied by each of the one or more selected power sources may include one or more of bypassing a buck-boost DC conversion circuit coupled to one of the multiple power sources, enabling a connection of one of the multiple power sources to the information handling system through its respective DC adapter, disabling a connection of one of the multiple power sources to the information handling system through its respective DC adapter, enabling a link between two of the multiple power sources, and disabling a link between two of the multiple power sources.

In another aspect, a disclosed information handling system includes a plurality of interface elements, each of which is configured to receive input power from a respective power source through a respective direct current (DC) adapter, a processor, and non-transitory computer readable memory media. The non-transitory computer readable memory media stores instructions executable by the processor for detecting connection of multiple power sources to the information handling system through respective ones of the DC adapters, obtaining data indicating capabilities of each of the multiple power sources, obtaining data indicating a system load for the information handling system, determining, based on the data indicating capabilities of each of the multiple power sources and the data indicating a system load, a target combined input power amount for power supplied by the multiple power sources and a respective amount of electrical power to be supplied by each of one or more power sources selected from among the multiple power sources to supply the target combined input power amount, initiating the combining of the respective amounts of power supplied by each of the one or more selected power sources into a combined input power for the information handling system, and causing the combined input power to be supplied to the information handling system.

In any of the disclosed embodiments, the system load for the information handling system may be dependent on one or more of a requested amount of electrical power, a calculated amount of electrical power, a negotiated amount of electrical power, and an amount of electrical power required for charging an internal battery of the information handling system.

In any of the disclosed embodiments, for at least two of the multiple power sources, the power supplied by the at least two power sources may have dissimilar electrical characteristics, the dissimilar electrical characteristics including different DC voltage profiles or different wattages, and the information handling system may further include a buck-boost DC conversion circuit configured to step the DC voltage of the power supplied by at least one of the selected power sources up or down prior to the combining.

In any of the disclosed embodiments, the target combined input power amount may be less than the sum of the rated power outputs of each of the one or more selected power sources, and initiating the combining of the respective amounts of power supplied by each of the one or more selected power sources may include de-rating at least one of the selected power sources.

In any of the disclosed embodiments, for at least two of the multiple power sources, the respective DC adapters may be of dissimilar physical types or may adhere to different power delivery protocols.

In any of the disclosed embodiments, a single one of the multiple power sources may be selected to supply all of the target combined input power amount.

In any of the disclosed embodiments, initiating the combining of the respective amounts of power supplied by each of the one or more selected power sources may include one or more of initiating the bypassing of a buck-boost DC conversion circuit coupled to one of the multiple power sources, enabling a connection of one of the multiple power sources to the information handling system through its respective DC adapter, disabling a connection of one of the multiple power sources to the information handling system through its respective DC adapter, enabling a link between two of the multiple power sources, and disabling a link between two of the multiple power sources.

In yet another aspect, a disclosed non-transitory computer readable memory media stores instructions executable by a processor for detecting connection of multiple power sources to an information handling system through respective ones of the DC adapters, obtaining data indicating capabilities of each of the multiple power sources, obtaining data indicating a system load for the information handling system, determining, based on the data indicating capabilities of each of the multiple power sources and the data indicating a system load, a target combined input power amount for power supplied by the multiple power sources and a respective amount of electrical power to be supplied by each of one or more power sources selected from among the multiple power sources to supply the target combined input power amount, initiating the combining of the respective amounts of power supplied by each of the one or more selected power sources into a combined input power for the information handling system, and causing the combined input power to be supplied to the information handling system.

In any of the disclosed embodiments, initiating the combining of the respective amounts of power supplied by each of the one or more selected power sources may include one or more of initiating stepping the DC voltage of the power supplied by at least one of the selected power sources up or down, and de-rating at least one of the selected power sources.

In any of the disclosed embodiments, initiating the combining of the respective amounts of power supplied by each of the one or more selected power sources may include one or more of initiating the bypassing of a buck-boost DC conversion circuit coupled to one of the multiple power sources, enabling a connection of one of the multiple power sources to the information handling system through its respective DC adapter, disabling a connection of one of the multiple power sources to the information handling system through its respective DC adapter, enabling a link between two of the multiple power sources, and disabling a link between two of the multiple power sources.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
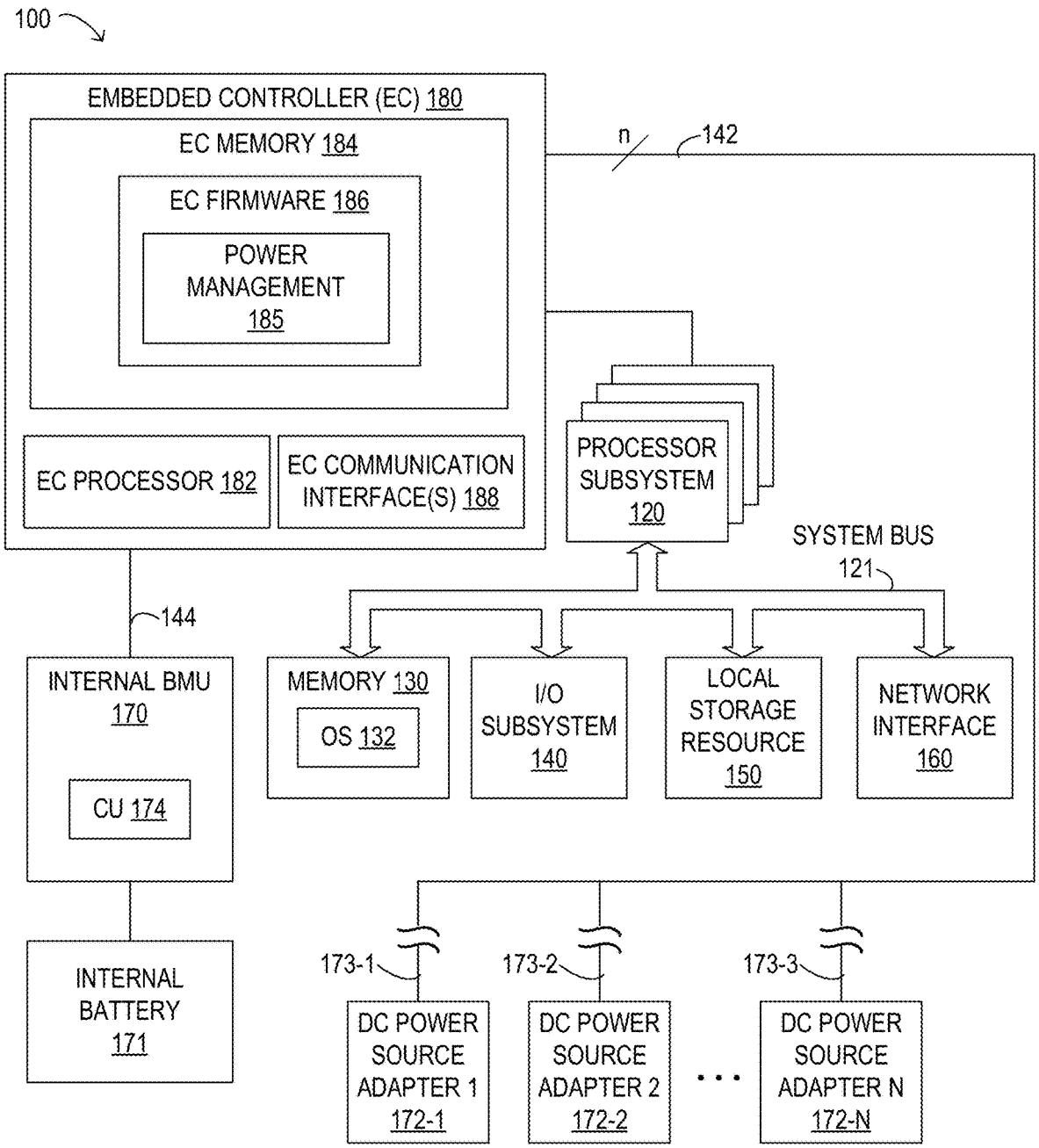
FIG. 1 is a block diagram illustrating selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Portable information handling systems exhibit a wide variety of configurations available from multiple vendors and may include any of a wide variety of accessories. These accessories often include a DC power adapter for supplying electrical power from a power source to the information handling system for operation and/or for charging an internal battery of the information handling system. DC power source adapters of different types may have different physical attributes (e.g., different sizes, shapes, or connector types), different electrical characteristics (e.g., different voltage profiles), or different power delivery capabilities and may adhere to different power delivery protocols. In some cases, portable information handling systems include multiple power ports, some of which may be configured to receive electrical power from DC power source adapters of different types. However, in existing systems, only one power port, and one DC power source adapter, can be used to supply electrical power to the system at a time. In some existing systems, when and if two power sources are connected, only the power source with the larger power capability supplies electrical power to the system. In these existing systems, there is no merging of the electrical power supplied by the two power sources nor any load balancing between the two power sources.

As described in more detail herein, in at least some embodiments of the present disclosure, multiple power ports of an information handling system may receive electrical power from respective DC power source adapters and the combined input power may be supplied to the system for operation and/or for charging an internal battery. For example, an information handling system may implement a load-based power management method that allows input power to be supplied to the system via multiple DC power source adapters by determining a target combined input power amount to be supplied by the multiple DC power source adapters and a respective amount of electrical power to be supplied by each power source selected to contribute to the target combined input power amount. In some cases, not all of the available and connected DC power source adapters are selected to contribute to the target combined input power amount.

In some embodiments, a load-based power management method may include negotiating a suitable output of interest from a DC power source adapter having multiple available voltage profiles based on the available voltage profiles, the power delivery capability of the adapter, and a requested, calculated, or negotiated system load. In at least some embodiments, the combined power delivery capability of multiple connected DC power source adapters may exceed the capability of any one of the individual adapters. In some embodiments, the electrical power supplied by multiple DC power source adapters may be combined internal to the device (e.g., as in a constant current mode) allowing for the summation of the electrical power supplied by the adapters. In one example, the electrical power supplied by two DC power source adapters each having a power delivery capability of 10 watts may be combined to supply 20 watts to the system. In another example, if two DC power source adapters connected to an information handling system are USB Type-C adapters, the information handling system may be configured to negotiate with the two adapters so that both supply electrical power at 20 volts, and then to merge the input power supplied by the two adapters into a single 20-volt power source. In some embodiments, to manage power distribution in an information handling system to which multiple connected DC power source adapters are connected, the information handing system may include a control structure to ensure that none of the individual adapters is overstressed (e.g., to avoid a case in which the first connected source carries a full load continuously, while a second connected source is only partially used).

In some embodiments, the DC power source adapters connected to a given information handling system may be of different types. For example, an information handling system may receive and combine multiple concurrent power inputs supplied through independent DC power source adapters with USB Type-C connectors and/or barrel connectors to implement fully integrated load-based power management.

Particular embodiments are best understood by reference to FIGS. 1-4 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Furthermore, information handling system 100 is shown removably coupled to multiple DC power inputs 173 that may supply electrical power for operation of information handling system 100, including for charging internal battery 171, received from one or more DC power sources through respective direct current (DC) power source adapters 172.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

In particular embodiments, embedded controller 180 may support one or more power busses 142 that carry and distribute electrical power to and from portable information handling system 100. In some embodiments, a power bus 142 may represent a data bus that also carries and distributes electrical power to and from portable information handling system 100. For example, a DC power input 173 received from an external power source through a respective DC power source adapter 172 may be routed via a DC power connection 144 to internal BMU 170-1 for purposes of charging internal battery 171 or otherwise powering portable information handling system 100.

In various embodiments, a power bus 142 may represent a variable power bus that supports different levels of direct current (DC) power that may be provided to certain peripherals connected to I/O subsystem 140. In certain embodiments, a variable power bus 142 may be implemented according to an industry standard, such as a USB Universal Serial Bus (USB), which is developed and supported by the USB Implementers Forum, Inc. (USB IF, www.usb.org). In particular, a variable power bus 142 may be implemented as a USB Type-C bus that may support different USB devices, such as USB Type-C devices with USB Type-C connectors. Accordingly, a variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, or a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B Super-Speed, Mini-A, Mini-B, Micro-A, Micro-B, Micro-B Super-Speed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 watts to 100 watts.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

In certain embodiments, a power bus 142 may receive a DC power input 173 through a connector other than a USB type connector. For example, one or more of DC power source adapters 172 may include a barrel-type connector, a Lightning™ connector developed by Apple, Inc., or a Thunderbolt™ connector developed by Apple, Inc., among other connector types. In some embodiments, one or more external power sources may be electrically coupled to an information handling system using means other than a DC power source adapter and the electrical power they supply may be combined with other externally supplied electrical power in a manner similar to that described herein for combining electrical power supplied by multiple connected DC power source adapters. For example, in some embodiments, the techniques described herein may be applied to combine electrical power supplied by an external battery or other type of external power source (e.g., a wireless charging solution, a solar power solution, etc.) with electrical power supplied by other such power sources or by one or more DC power source adapters.

Also shown in FIG. 1 is embedded controller (EC) 180, which may include EC processor 182 as a second processor included within portable information handling system 100 for certain management tasks, including supporting communication and providing various functionality with respect to internal BMU 170. Thus, EC processor 182 may have access to EC memory 184, which may store EC firmware 186, representing instructions executable by EC processor 182. As shown, EC firmware 186 includes power management 185, which may represent executable code for managing multiple DC power sources, as well as for controlling various operating parameters of internal battery 170, as disclosed herein.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

In the illustrated embodiment, embedded controller 180 may be responsible for managing electrical power connections between internal or external power sources and other portions of portable information handling system 100. In other embodiments, power control may be implemented by a separate power controller external to embedded controller 180. For example, a power bus 142 may supply electrical power to portable information handling system 100, in which case embedded controller 180, or a separate power controller, may determine whether the electrical power is used to charge internal battery 171 or to directly power portable information handling system 100. In another example, embedded controller 180, or a separate power controller, may manage so-called 'soft start up' of portable information handling system 100, such as when portable information handling system 100 awakes from a low power state, such as sleep mode, by determining a source of power during the low power state and managing operation of portable information handling system 100 during the low power state. In the illustrated embodiment, DC power and control 144 may represent suitable connections between embedded controller 180 and internal BMU 170, for example. This may include connections for providing data obtained from internal battery 171 (e.g., temperature, battery state, state of charge, etc.), which may serve as inputs for load-based management of multiple external DC power sources that supply electrical power to information handling system 100 through respective DC power source adapters 172. It is noted that in some embodiments, at least certain portions of the methods for load-based management of multiple external DC power sources described herein may be implemented using EC firmware 186, such as specialized executable instructions for power management and control.

As illustrated in FIG. 1, portable information handling system 100 may include a battery management unit (BMU) 170 that controls operation of internal battery 171. In particular implementations, BMU 170 may be embedded within a respective battery whose operation BMU 170 controls. For example, internal BMU 170 within portable information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, internal battery 171 illustrated in FIG. 1 may be considered to be discharged when an SOC of the battery corresponds to an SOC that is below a predetermined threshold percentage or amount below the 100% charge level given by the TOC voltage, such as below a 5% charge level in one example. Internal battery 171 may be considered to be charged, i.e., at least partially charged, when the SOC for the battery corresponds to an SOC that is above a first predetermined threshold percentage or amount below the 100% charge level given by the TOC voltage, such as above the 25% charge level in one example. Internal battery 171 may be considered to be fully charged when the SOC of the battery corresponds to an SOC that is above a second predetermined threshold percentage or amount below the 100% charge level given by the TOC voltage, such as above the 95% charge level for example. Internal battery 171 may be considered to be at least partially discharged when the SOC of the battery corresponds to an SOC that is below the 100% charge level. The parameters for specifying an SOC described above are examples and may be modified using different values in different embodiments.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations. In some embodiments, internal battery 171 may include one or more cells based on any one of a variety of Lithium-ion electrochemistries, or one or more cells based a different electrochemistry than Lithium-ion.

As shown in FIG. 1, each DC power source adapter 172 may be designed to removably couple to portable information handling system 100 using a power bus 142. For example, a power bus 142 may include power connections for electrically coupling a DC power source adapter 172 to portable information handling system 100 as an external load on DC power source adapter 172. In certain embodiments, a power bus 142 may be a variable power bus that also includes a communication link to enable a DC power source adapter 172 to communicate with portable information handling system 100. For example, a DC power source adapter 172 may communicate power delivery capabilities of the DC power source adapter 172 to portable information handling system 100 over a communication link within a variable power bus 142. In other embodiments, there may be a communication link between a DC power source adapter 172 and portable information handling system 100 that is separate from any of the power busses 142 instead of, or in addition to, a communication link that is part of a variable power bus 142. In some embodiments, a communication link between DC power source adapter 172 and portable information handling system 100 may operate in accordance with a System Management Bus (SMBus) protocol for sending and receiving data. As noted above, in particular embodiments, a variable power bus 142 may be compatible with USB Type-C and may be implemented according to USB Type-C and USB Power Delivery specifications promulgated by USB IF.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. One or more temperature sensors may be located in proximity to the battery cells to provide accurate indications of the temperature at different locations within battery 171. The fuse may be a safety element for limiting current flowing through the main power circuit. The power switch may be an electronically controlled switching element that closes or opens the main power circuit, and thereby allows the battery to operate for charging or discharging.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 171.

In some embodiments, parameters monitored by a BMU 170 may include a charging current, a voltage, a battery impedance, and a temperature associated with internal battery 171. More specifically, the parameters monitored by the BMU 170 may include any or all of the cell configuration and chemistry of battery cells within internal battery 171, the total voltage of internal battery 171, the voltages of individual battery cells in internal battery 171, minimum or maximum cell voltages, the average temperature of internal battery 171 as a whole, the temperatures of individual battery cells in internal battery 171, a battery temperature distribution value as described herein, the SOC of internal battery 171, the depth of discharge of internal battery 171, the current flowing into internal battery 171, the current flowing out of internal battery 171, and any other measurement of the overall condition of internal battery 171, in various embodiments. In some embodiments, monitoring the SOC may include continuous or periodic monitoring of output current, voltage, or both for internal battery 171. In some cases, Coulomb counting, in which the charge delivered or stored by a battery is tracked, is used for monitoring of internal battery 171. In some embodiments, a battery temperature may be monitored through the use of periodic voltage measurements, a thermometer, or another type of sensor or method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to power management 185 to implement the methods disclosed herein for load-based management of multiple DC power sources, as well as for internal battery management. In some embodiments, power management 185 may be, or include, a power management microcontroller for portable electronics that is designed to accept multiple DC power inputs and generate a load management plan, as described herein. In some embodiments, power management 185 may be, or include, a battery management microcontroller for portable electronics that is designed to accept multiple inputs including, for example, temperature inputs and/or digital data inputs. In some embodiments, the management methods described herein may take advantage of such hardware, if available in the information handling system. In other embodiments, BMU 170 may be configured to implement internal battery management.

In some embodiments, BMU 170 may calculate additional values, based on the monitored battery parameters or other information obtained from a battery (such as internal battery 171) in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. For example, a remaining battery capacity may be measured in mWh by BMU 170. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof.

In certain embodiments, BMU 170 may include a processor and memory (not shown). The memory may store instructions executable by the processor to perform one or more methods for obtaining and calculating values related to the operation and charging of a battery and for controlling the operation and charging of the battery. The memory may also store data, obtained and calculated values, thresholds, load management plans specifying a target combined input power amount and/or respective amounts of electrical power to be supplied by selected ones of multiple DC power source adapters, and/or any other parameters related to the methods described herein.

In at least some embodiments, in order to generate a load management plan for an information handling system in which electrical power supplied by multiple DC power source adapters can be combined, the system may implement a method for determining the power delivery capability (rating) of each source and the voltage at which power is supplied by each source. Based on any differences in ratings, and other information about each source, a load management plan may be generated specifying a target combined input power amount for power supplied by the multiple power sources and a respective amount of electrical power to be supplied by each of one or more power sources selected from among the multiple power sources to supply the target combined input power amount. Examples combinations in which two DC power sources have different ratings include:

one 45-watt adapter+one 90-watt adapter
two 45-watt adapters
one 45-watt adapter+an external battery or other type of external power source (e.g., a wireless charging solution, a solar power solution, etc.)

In each example, either the larger source (i.e., the source with the larger power delivery capability) or the smaller source (i.e., the source with the smaller power delivery capability) may supply power at a higher voltage, meaning that this source will work to its maximum capability to support the load. In some embodiments, the information handling systems described herein may implement a load-based power management method to adjust the system load to a target combined output rating for two power sources (sometimes described herein in terms of a target combined input power amount). This target combined output rating may represent a de-rating on the order of 0-50% depending on the difference between the ratings of the two sources. In other words, the greater the difference between the ratings of the two sources, the more advantageous it may be to apply a de-rating to the combined outputs of the two sources.

In one example, if two DC power source adapters are connected to an information handling system and the adapter with the lower power delivery capability has a higher voltage, it may be de-rated to a maximum load that it can support continuously. In this example, the other adapter would take a larger share of the load. In the first example shown above, if one 45-watt adapter and one 90-watt adapter are connected to an information handling system, the combined output may be de-rated to 120 watts rather than to the maximum theoretical output of 135 watts. In the second example, since the two adapters have the same power delivery capability of 45 watts, there may be little or no de-rating applied to the combined output of the two adapters. In the third example, the amount of de-rating applied may be dependent on the power delivery capability and/or other characteristics of the external power source other than the 45-watt adapter. In some embodiments, dissimilar input sources (e.g., in terms of voltage) may be used in combination with internal buck/boost stages within the power management circuitry of the information handling system to enable application of the negotiation methods and logic described herein for combination into a single power source.

In some embodiments, multiple power sources may be connected to an information handling system using adapters with different physical, as well as electrical, characteristics at respective power ports. In one example, an information handling system may include two Thunderbolt™ type ports through which respective power sources can be connected to the system as well as a single USB Type-C port through which a power source can be connected to the system. In another example, an information handling system may include a single DC-In 7.4 mm barrel-type port, plus two USB 3.1 type ports (one of which may accept input power), a single USB Type-C port, and a single Thunderbolt™ type port. In general, the techniques described herein may allow an information handling system to receive input power using multiple adapters of different types (e.g., multiple adapters with USB Type-C connectors, and/or combinations of adapters with USB Type-C type connectors and barrel-type connectors) at greater than an individual 100-watt connector limit by aggregating sources within the system. In some embodiments, these techniques may be used to enable system operation, including turbo modes and/or modes in which the internal battery is rapidly charged, for example, by allowing a combined input power to be higher than the limit for each individual connector.

In some embodiments, depending on the capabilities of two power sources connected to an information handling system and/or the system load, rather than merging the electrical power supplied by the two power sources, the load-based power management method described herein may select a single power source to supply a target combined input power amount. For example, a single power source may be selected based on its relative performance (e.g., the power source with the largest power delivery capability may be selected for maximum performance) or for higher efficiency (e.g., the power source with the minimum power delivery capability that can supply the target combined input power amount may be selected to maximize efficiency). In some embodiments, when an information handling system is in a low power state (e.g., in a standby state, a hibernation state, or a battery topping-off or trickle-charging state), a single DC power source adapter whose power delivery capability is most closely matched to the load may be selected to supply electrical power to the system. In one example, a small adapter (e.g., a 5-watt or 10-watt adapter) and another, larger, adapter may be connected to an information handling system while the system is in a standby mode. In this example, sourcing electrical power from the larger adapter may result in a greater loss of electrical power in the adapter itself than the amount of electrical power the system draws. Therefore, the small adapter may be selected to supply electrical power while the system remains in the standby mode. If and when the information handling system begins operating in a higher power mode, electrical power may be supplied to the system from the larger adapter or the electrical power of the two adapters may be combined and provided to the system.

Figure 2:
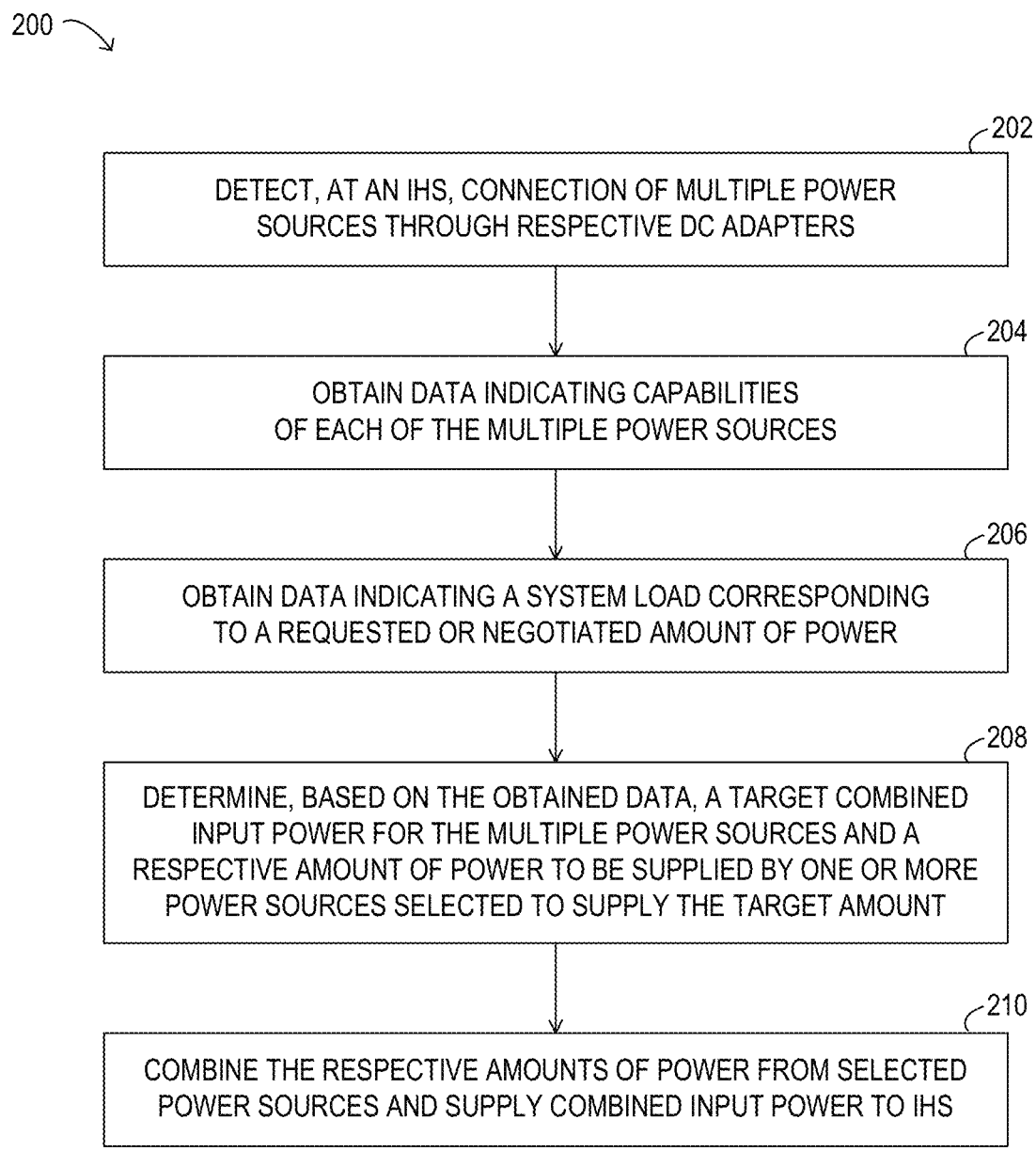
FIG. 2 is flow diagram illustrating selected elements of a method for load-based management of multiple DC power sources.

Referring now to FIG. 2, selected elements of an embodiment of method 200 for load-based management of multiple DC power sources, as described herein, is depicted in flowchart form. In certain embodiments, method 200 may be performed using portable information handling system 100 (see FIG. 1) and, in particular, by power management 185 within EC controller 180, to manage multiple DC power sources. Method 200 may be performed repeatedly or continuously to manage multiple DC power sources based, at least in part, on the state of the information handling system and/or the type or state of the DC power sources themselves. It is noted that certain operations described in method 200 may be optional or may be rearranged in different embodiments.

Method 200 may begin, at 202, with detecting, at an information handling system (IHS), the connection of multiple power sources through respective DC adapters. In some embodiments, the power supplied by at least two of the power sources may have different electrical characteristics, such as different voltage profiles and/or different wattages. For example, one DC power source may be configured to deliver power to the information handling system through a 45-watt DC power source adapter, while another DC power source may be configured to deliver power to the information handling system through a 90-watt DC power source adapter. In some embodiments, at least two of the power sources may be connected to the information handling system through connectors that are of different physical connector types and/or that deliver DC power in accordance with different power delivery protocols. For example, one DC power source may be connected to the information handling system through a USB Type-C connector, while another DC power source may be connected to the information handling system through a barrel-type connector.

The method may include, at 204, obtaining data indicating capabilities of each of the respective power sources. For example, in some embodiments, the data obtained for each of the power sources may include data indicating one or more available voltage profiles for the power source, a rated power delivery capability for the power source, a maximum power delivery capability for the power source, and/or a power delivery protocol for the power source or for the DC power source adapter through which the power source supplies power to the information handling system. In various embodiments, data indicating the capabilities of each of the respective power sources may be obtained from the power sources themselves (e.g., over a data line of the respective DC power source adapter), from one or more tables stored in a memory in the information handling system, or from other information sources.

Method 200 may include, at 206, obtaining data indicating a system load. In certain embodiments, the system load indicated by the obtained data may represent a requested amount of electrical power, a calculated amount of electrical power, or a negotiated amount of electrical power. In some embodiments, data indicating a system load negotiated as part of a power contract, as described above, may be stored in a memory in the information handling system. In certain embodiments, the system load may be dependent on an amount of electrical power required to charge an internal battery of the information handling system.

At 208, the method may include generating, based on the obtained data, a load management plan. Generating the load management plan may include determining a target combined input power for the multiple power sources and a respective amount of electrical power to be supplied by each of one or more power sources selected from among the multiple power sources. These and other parameters related to the load-based power management techniques described herein may be stored in a memory in the information handling system, in some embodiments. As described in more detail herein, the load management plan may specify that a single one of the multiple power sources is selected to supply all of the target combined input power or may specify that two or more of the multiple power sources are selected to collectively supply the target combined input power.

At 210, method 200 may include combining the respective amounts of power supplied by the one or more selected power sources into a combined input power and supplying the combined input power to the information handling system.

Figure 3:
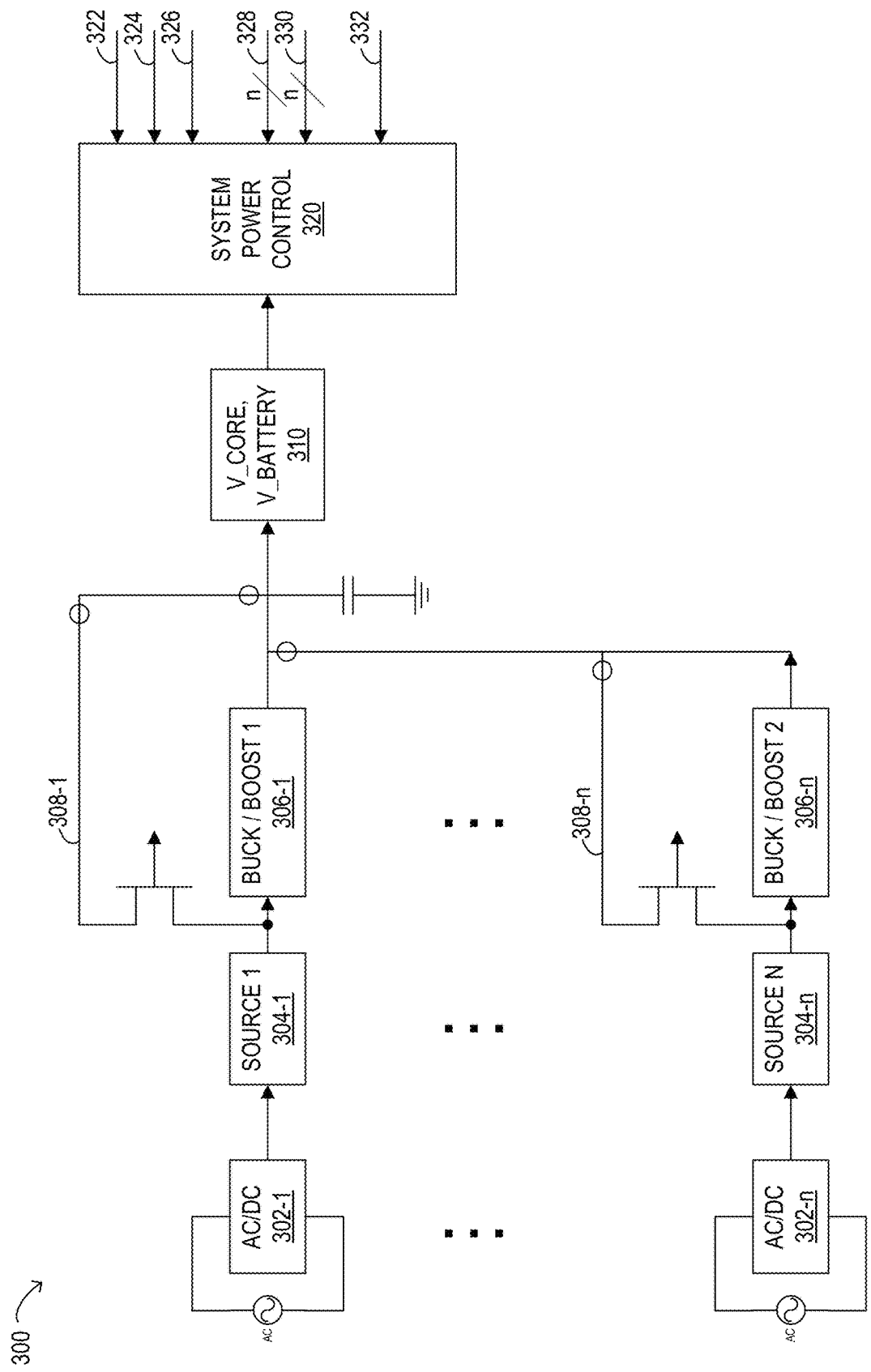
FIG. 3 is a block diagram illustrating selected elements of an embodiment of a power accumulator circuit for controlling power delivery in a system connected to multiple DC power source adapters.

FIG. 3 is a block diagram illustrating selected elements of an embodiment of a power accumulator circuit for controlling power delivery in a system, such as portable information handling system 100 illustrated in FIG. 1, that is connected to multiple input DC adapters. It is noted that FIG. 3 is not drawn to scale but is a schematic illustration. In the illustrated embodiment, power accumulator circuit 300 includes multiple DC power sources, including source 1 (304-1) and source N (304-n), each of which is coupled to an output of a respective AC/DC convertor 302 and is connected to the system through a respective DC adapter to supply electrical power to the system.

In the illustrated embodiment, each of the power sources 304 is coupled to a respective buck-boost DC conversion circuit 306 that may, optionally, be used to step the DC voltage of the electrical power supplied by the power source up or down in order to match the voltages of the power sources selected for supplying power to the system prior to combining them for delivery to the system. For example, if source 1 (304-1) is a 20-volt power source and source N (304-n) is a 15-volt power source, buck-boost DC conversion circuit 306-n may be configured to boost the electrical power supplied by source N (304-n) up to 20 volts prior to combining it with the electrical power supplied by source 1 (304-1). In some embodiments, each buck-boost DC conversion circuit 306 may be externally controlled to provide a desired DC voltage output from a respective power source 304, such as in response to a control signal from system power control 320 or in response to another trigger condition.

In the illustrated embodiment, power accumulator circuit 300 includes system power control 320, which may be configured for implementing load-based management of multiple DC power sources, including generating a load management plan for the system. In some embodiments, system power control 320 may be, or may be an element of, power management 185 illustrated in FIG. 1. As shown in FIG. 3, the inputs to system power control 320 may include, but are not limited to, the temperature of the system (shown as skin temperature 322), an indication of the state of the operating system (shown as OS condition 324), an indication of the state of the BIOS (shown as BIOS condition 326), and an input 322 representing the best energy state needed (based, for example, on a requested amount of electrical power, a calculated amount of electrical power, a negotiated amount of electrical power, and/or an amount of electrical power required to charge an internal battery of the system).

Other inputs to system power control 320 may include, for each of the multiple DC power sources 304, inputs representing an adapter type 328 and an adapter status 330 for the respective DC power source adapters through which each power source 304 supplies power to the system. Additional inputs to system power control 320 may include, for example, data indicating the state of the combined input power supplied by the multiple power sources 304 and/or the state of an internal battery in the system, shown as V_core, V_battery 310. Based on an analysis of at least these inputs, system power control 320 may generate, and initiate the implementation of, a load management plan. As described above, the load management plan may specify a target combined input power amount for power supplied by the power sources 304 and a respective amount of electrical power to be supplied by each of one or more of the power sources 304 selected from among the connected power sources 304 to supply the target combined input power amount. The load management plan (or any of the parameters specified therein) may be stored in a memory within system power control 320 or elsewhere in the information handling system, e.g., in one or more tables or other types of data structures configured to store parameter values related to the operation of the information handling system or a power management component thereof. In at least some embodiments, in response to certain types of power events or system events, system power control 320 may repeat the analysis described above and update the load management plan (or various parameters thereof), if necessary. For example, in response to a change in the system load or the collective capabilities of the DC power source adapters connected to the information handling system, system power control 320 may be configured to determine a different target combined input power amount and/or different respective amounts of power to be supplied from each of the same or different connected power sources.

In the illustrated embodiment, each of the power sources 304 is coupled to a respective bypass circuit, shown as bypass 308. In the case that the DC voltage of the power supplied by a particular one of the power sources 304 does not need to be stepped up or down prior to being supplied directly to the system or prior to being combined with another one of the power sources 304 for delivery to the system (in accordance with the load management plan), the power supplied by the particular power source may bypass the respective buck-boost DC conversion circuit 306 for the power source over bypass 308. For example, system power control 320 may initiate the bypassing of the buck-boost DC conversion circuit 306 coupled to a particular power source 304 when no change to the DC voltage of the power supplied by the power source is needed for voltage matching (not shown in FIG. 3).

In the illustrated embodiment, power accumulator circuit 300 includes multiple configurable links, shown as circular elements at the intersections of various power deliver paths. Under certain circumstances, different ones of these links may be enabled or disabled to combine the respective amounts of power to be supplied by each of one or more selected power sources 304 in order to supply the target combined input power amount to the system. For example, system power control 320 may initiate the enabling or disabling of particular links to combine the power supplied by selected power sources 304 (and not any unselected power sources 304) in accordance with the load management plan (not shown in FIG. 3).

In the embodiment illustrated in FIG. 3, only two power sources are shown in detail. However, power accumulator circuit 300 may include circuity to support any number of power sources, in other embodiments. In one example embodiment, power accumulator circuit 300 may be configured to support up to five power sources. In the embodiment illustrated in FIG. 3, power sources 304-1 and 304-$n$ are shown as being driven by respective AC/DC convertors. However, in other embodiments, one or more of the multiple power sources 304 may represent other types of external power sources including, but not limited to, an external battery, a wireless charging solution, and/or a solar power solution, any of which may be coupled to power accumulator circuit 300 or another element of an information handling system using any suitable type of wired or wireless interface protocol and/or physical connection.

Figure 4:
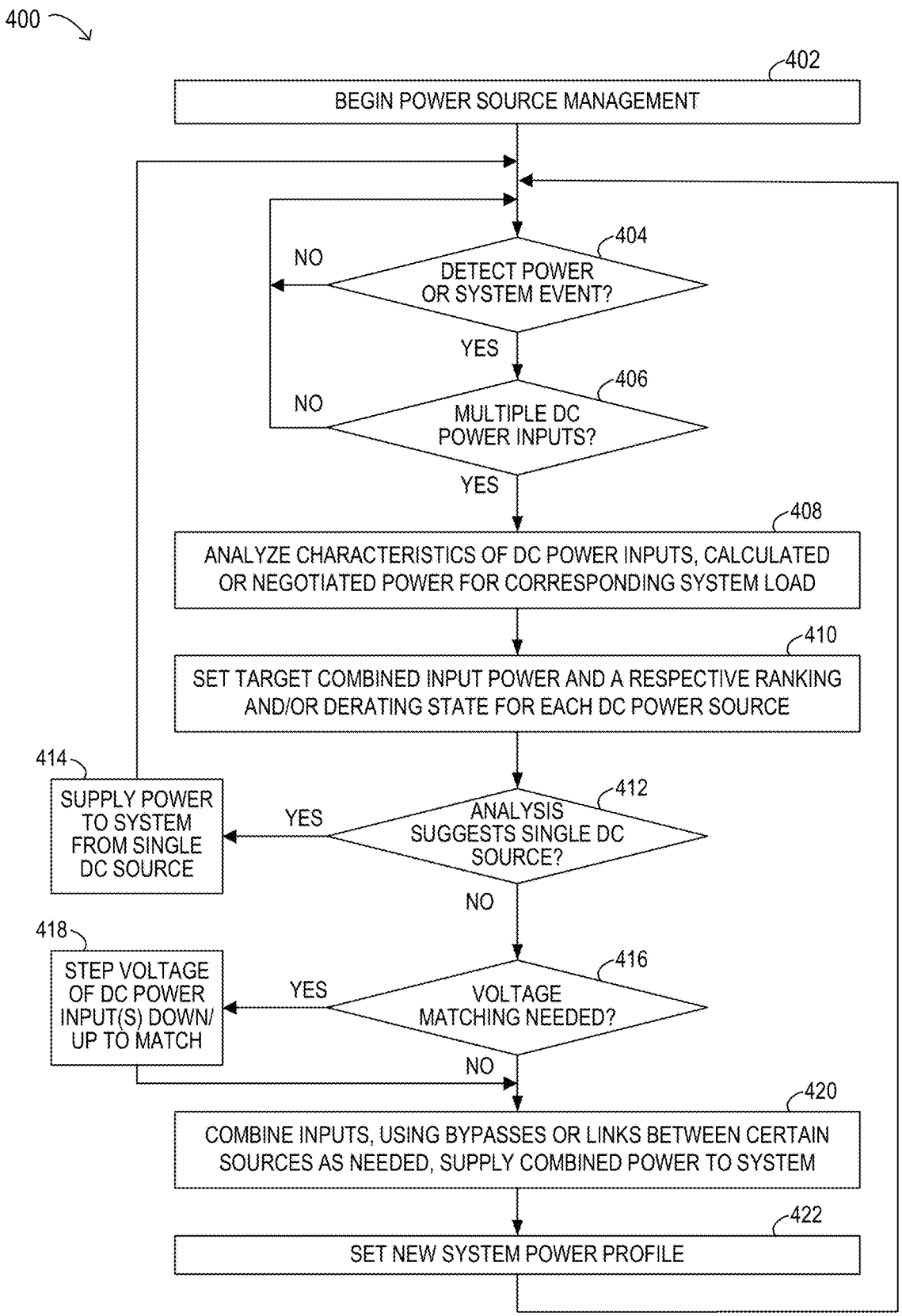
FIG. 4 is flow diagram illustrating selected elements of a method for managing multiple DC power sources in response to power or system events.

Turning now to FIG. 4, selected elements of an embodiment of a method 400 for managing multiple DC power sources in response to power or system events, as described herein, is depicted in flowchart form. Method 400 may be performed using portable information handling system 100 (see FIG. 1) and, in particular, by power management 185 within EC controller 180, to manage multiple DC power sources. Method 400 may be performed repeatedly or continuously to manage multiple DC power sources in response to various power events or system events. It is noted that certain operations described in method 400 may be optional or may be rearranged in different embodiments.

Method 400 may include, at 402, beginning to manage the power sources of an information handling system. Method 400 may include, at 404, determining whether a power event or system event has been detected. For example, particular types of system and/or power events may represent a power state change that impacts the amount of electrical power needed to operate the system (and/or to charge an internal battery) and/or the available sources of that power. A power state change may include, for example, a change in the amount of DC input power available to be supplied from a particular DC power source, a change in the number or type of DC power sources connected to the system, a change in system load, a change in a thermal condition in the system or in a DC power source, a change in a sensor reading in the system or in a DC power source, a change in an operating state of the system (e.g., a change into or out of a sleep state or other low power state), a change in the battery state of an internal battery in the system, or another type of power or system event, in different embodiments. If a power or system event is detected, method 400 may continue at 406. Otherwise, the method may return to 404 until and unless a power event or system event is detected.

If, at 406, there are multiple DC power inputs (e.g., if respective DC adapters for two or more power sources are connected to the information handling system), method 400 may include, at 408, analyzing the characteristics of the DC power inputs, along with a requested, calculated, or negotiated amount of electrical power for a corresponding system load.

The method may also include, at 410, setting a target combined input power and a respective ranking and/or derating state for each DC power source. For example, a power system controller, such as power management 185 illustrated in FIG. 1 or power system control 320 illustrated in FIG. 3, may analyze various system parameters and inputs associated with each of the DC power sources to generate a load management plan for the system. The analysis may include determining a system power level that is suitable for the context in which the system is operating and that fits within the constraints of the available DC power sources. In one example, if the system is operating in a standby mode in which the amount of electrical power needed for operation is less than the power supplied by any one of the connected DC power sources, the analysis may result in selection of a single power source to supply all of the power needed for operation, with or without de-rating the power source. In this example, the single power source selected to supply the electrical power may be the power source having the smallest power deliver capacity that is sufficient to meet the needs of the system while it is operating in the standby mode, which may represent the most efficient choice until or unless another power event or system event is detected that changes the power state.

In another example, the analysis may include setting a ranking state and/or a de-rating state for each of two or more selected power sources that are, collectively, to supply the target amount of power to the system. De-rating may ensure that the loading on any of the power sources does not result in the current being overdrawn. In at least some embodiments, if all of the selected power sources supply electrical power through similar DC power source adapters (e.g., if all of the DC power source adapters supply electrical power at the same wattage), each of the selected power sources may have a de-rating of zero. On the other hand, if the selected power sources supply electrical power through dissimilar DC power source adapters (e.g., if not all of the DC power source adapters supply electrical power at the same wattage), one or more of the power sources may be de-rated. More specifically, based on the total delta between the output power ratings of a smaller adapter and a larger adapter, the smaller adapter may be de-rated such that the loading on the smaller adapter is held well within the design and/or thermal limits of the smaller adapter. In one embodiment, the amount of de-rating may be fixed, e.g., at 75% of the nominal rating for the DC power source adapter. In other embodiments, the amount by which a smaller adapter is de-rated may be dependent on the specific ratings of the selected power sources and/or the specific system load. Note that, in cases in which the source voltages are common amongst the selected power sources, combining the DC power inputs from the selected power sources may be simpler and may require less de-rating than when they are dissimilar.

If, at 412, the analysis suggests that electrical power should be supplied from a single DC power source, the method may include supplying electrical power to the system from a single one of the multiple DC power sources, as in 414. In some embodiments, the single DC power source selected may be the one of the multiple power sources having the smallest power delivery capability that is sufficient to supply the target combined input power amount.

As described herein, different DC power source adapters may supply electrical power at different voltages. In at least some embodiments, a buck-boost DC conversion circuit may be used to offset the voltages of one or more of the selected power sources so that the power supplied by the selected power sources can be combined at a common voltage. For example, if, at 416, multiple DC power sources are selected to collectively supply electrical power to the system and at least some of the selected power sources supply electrical power at different voltages, voltage matching may be needed prior to combining the electrical power from the selected power sources. In this case, the method may include stepping the voltage of the power supplied by one or more of the selected DC power sources down or up, as in 418, so that the voltages of all of the selected power supplies match. In some embodiments, the DC power inputs of one or more of the selected power sources may be stepped up or down to match the voltage of a particular one of the selected power sources. In other embodiments, the DC power inputs of all of the selected power sources may be stepped up or down to match an arbitrary voltage that is different from the voltages of any of the selected power sources. If, however, all of the DC power sources that are selected to collectively supply electrical power to the system are similar, or at least supply electrical power at a substantially similar voltage, voltage matching may not be needed.

Method 400 may include, at 420, combining the DC power inputs supplied by the selected power sources. This may include, in some cases, enabling and/or disabling various bypasses and links within a power accumulation circuit, as needed, to supply the target combined input power to the system in accordance with the generated load management plan. The method may also include, at 422, setting a new system power profile. Subsequently, method 400 may return to 404. In at least some embodiments, in response to certain types of power events or system events, the operations shown as 404 to 422 may be repeated to update the load management plan (or various parameters thereof) and implement the updated load management plan, as appropriate.

As disclosed herein, load-based power management techniques may be used to select and/or combine electrical power supplied by multiple power sources coupled to an information handling system. Electrical power from the power sources may be supplied through respective DC power source adapters that have dissimilar physical and/or electrical characteristics. Using these techniques, electrical power may be combined and supplied to an information handling system through standard connections at a much higher delivery rate than is possible through any single one of the connections.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for power source management in an information handling system, comprising:

detecting connection of multiple power sources to the information handling system through respective direct current (DC) adapters;
obtaining data indicating capabilities of each of the multiple power sources;
obtaining data indicating a system load for the information handling system;
determining, based on the data indicating capabilities of each of the multiple power sources, that the system load is less than a power supplied by at least one of the power sources of the multiple power sources indicating that the information handling system is in a standby mode, and in response, identifying a particular power source of the multiple power sources having a smallest power delivery capacity that is capable of supplying the system load, and supplying input power from the identified particular power source to the information handling system;
determining, based on the data indicating capabilities of each of the multiple power sources, that the system load is greater than the power supplied by a single power source such that two or more power sources of the multiple power sources are to supply power to the information handling system, and in response:
   calculating, based on the data indicating capabilities of each of the multiple power sources and the data indicating a system load, a target combined input power amount for power supplied by the multiple power sources that matches the system load, the calculating including:
   adjusting the DC voltage of the power supplied by one or more of the multiple power sources by stepping up or down the DC voltage of the power of one or more of the multiple power sources such that the DC voltage of the power of at least one power source of the multiple power sources differs from the DC voltages of the power of the remaining multiple power sources;
   after adjusting the DC voltage of the power supplied by one or more of the multiple power sources, combining the respective amounts of power supplied by each of the one or more multiple power sources into a combined input power for the information handling system; and
   supplying the combined input power to the information handling system.

2. The method of claim 1, wherein the system load for the information handling system is dependent on a requested amount of electrical power, a calculated amount of electrical power, or a negotiated amount of electrical power.

3. The method of claim 1, wherein:
the target combined input power amount is less than the sum of the rated power outputs of each of the one or more selected power sources; and
combining the respective amounts of power supplied by each of the one or more selected power sources comprises de-rating at least one of the selected power sources.

4. The method of claim 1, wherein, for at least two of the multiple power sources, the respective DC adapters are of dissimilar physical types or adhere to different power delivery protocols.

5. The method of claim 1, wherein the data indicating a system load for the information handling system comprises data specifying an amount of electrical power required for charging an internal battery of the information handling system.

6. The method of claim 1, wherein combining the respective amounts of power supplied by each of the one or more selected power sources comprises one or more of:
bypassing a buck-boost DC conversion circuit coupled to one of the multiple power sources;
enabling a connection of one of the multiple power sources to the information handling system through its respective DC adapter;
disabling a connection of one of the multiple power sources to the information handling system through its respective DC adapter;
enabling a link between two of the multiple power sources; and
disabling a link between two of the multiple power sources.

7. An information handling system, comprising:
a plurality of interface elements, each of which is configured to receive input power from a respective power source through a respective direct current (DC) adapter;
a processor; and
non-transitory computer readable memory media storing instructions executable by the processor for:
   detecting connection of multiple power sources to the information handling system through respective ones of the DC adapters;
   obtaining data indicating capabilities of each of the multiple power sources;
   obtaining data indicating a system load for the information handling system;
   determining, based on the data indicating capabilities of each of the multiple power sources, that the system load is less than a power supplied by at least one of the power sources of the multiple power sources indicating that the information handling system is in a standby mode, and in response, identifying a particular power source of the multiple power sources having a smallest power delivery capacity that is capable of supplying the system load, and supplying input power from the identified particular power source to the information handling system;
   determining, based on the data indicating capabilities of each of the multiple power sources, that the system load is greater than the power supplied by a single power source such that two or more power sources of the multiple power sources are to supply power to the information handling system, and in response:
      calculating, based on the data indicating capabilities of each of the multiple power sources and the data indicating a system load, a target combined input power amount for power supplied by the multiple power sources that matches the system load, the calculating including:
      adjusting the DC voltage of the power supplied by one or more of the multiple power sources by stepping up or down the DC voltage of the power of one or more of the multiple power sources such that the DC voltage of the power of at least one power source of the multiple power sources differs from the DC voltages of the power of the remaining multiple power sources;
      after adjusting the DC voltage of the power supplied by one or more of the multiple power sources, initiating the combining of the respective amounts of power supplied by each of the one or more multiple power sources into a combined input power for the information handling system; and causing the combined input power to be supplied to the information handling system.

8. The information handling system of claim 7, wherein the system load for the information handling system is dependent on one or more of:
   a requested amount of electrical power;
   a calculated amount of electrical power;
   a negotiated amount of electrical power; and
   an amount of electrical power required for charging an internal battery of the information handling system.

9. The information handling system of claim 7, further comprises a buck-boost DC conversion circuit configured to step the DC voltage of the power supplied by at least one of the selected power sources up or down prior to the combining.

10. The information handling system of claim 7, wherein:
   the target combined input power amount is less than the sum of the rated power outputs of each of the one or more selected power sources; and
   initiating the combining of the respective amounts of power supplied by each of the one or more selected power sources comprises de-rating at least one of the selected power sources.

11. The information handling system of claim 7, wherein, for at least two of the multiple power sources, the respective DC adapters are of dissimilar physical types or adhere to different power delivery protocols.

12. The information handling system of claim 7, wherein initiating the combining of the respective amounts of power supplied by each of the one or more selected power sources comprises one or more of:
   initiating the bypassing of a buck-boost DC conversion circuit coupled to one of the multiple power sources;
   enabling a connection of one of the multiple power sources to the information handling system through its respective DC adapter;
   disabling a connection of one of the multiple power sources to the information handling system through its respective DC adapter;
   enabling a link between two of the multiple power sources; and
   disabling a link between two of the multiple power sources.

13. Non-transitory computer readable memory media storing instructions executable by a processor for:
   detecting connection of multiple power sources to an information handling system through respective ones of the DC adapters;
   obtaining data indicating capabilities of each of the multiple power sources;
   obtaining data indicating a system load for the information handling system;
   determining, based on the data indicating capabilities of each of the multiple power sources, that the system load is less than a power supplied by at least one of the power sources of the multiple power sources indicating that the information handling system is in a standby mode, and in response, identifying a particular power source of the multiple power sources having a smallest power delivery capacity that is capable of supplying the system load, and supplying input power from the identified particular power source to the information handling system;
   determining, based on the data indicating capabilities of each of the multiple power sources, that the system load is greater than the power supplied by a single power source such that two or more power sources of the multiple power sources are to supply power to the information handling system, and in response:
      calculating, based on the data indicating capabilities of each of the multiple power sources and the data indicating a system load, a target combined input power amount for power supplied by the multiple power sources that matches the system load, the calculating including:
         adjusting the DC voltage of the power supplied by one or more of the multiple power sources by stepping up or down the DC voltage of the power of one or more of the multiple power sources such that the DC voltage of the power of at least one power source of the multiple power sources differs from the DC voltages of the power of the remaining multiple power sources;
      after adjusting the DC voltage of the power supplied by one or more of the multiple power sources, initiating the combining of the respective amounts of power supplied by each of the one or more multiple power sources into a combined input power for the information handling system; and
      causing the combined input power to be supplied to the information handling system.

14. The non-transitory computer readable memory media of claim 13, wherein initiating the combining of the respective amounts of power supplied by each of the one or more selected power sources comprises de-rating at least one of the selected power sources.

15. The non-transitory computer readable memory media of claim 13, wherein initiating the combining of the respective amounts of power supplied by each of the one or more selected power sources comprises one or more of:
   initiating the bypassing of a buck-boost DC conversion circuit coupled to one of the multiple power sources;
   enabling a connection of one of the multiple power sources to the information handling system through its respective DC adapter;
   disabling a connection of one of the multiple power sources to the information handling system through its respective DC adapter;
   enabling a link between two of the multiple power sources; and
   disabling a link between two of the multiple power sources.

* * * * *